United States Patent [19]
Scott et al.

[11] Patent Number: 5,749,151
[45] Date of Patent: May 12, 1998

[54] LEVEL MOUNT AND METHOD OF MEASURING THE LEVEL OF A MEMBER

[76] Inventors: Daniel B. Scott, 3617 W. 1100 North; Michael S. Franklin, 3596 W. 1100 North, both of New Palestine, Ind. 46163

[21] Appl. No.: 688,989

[22] Filed: Jul. 31, 1996

[51] Int. Cl.⁶ .................................................. G01C 9/00
[52] U.S. Cl. ...................................... 33/370; 33/372
[58] Field of Search .......................... 33/370, 347, 365, 33/371, 372, 373, 376

[56] References Cited

U.S. PATENT DOCUMENTS

| | | | |
|---|---|---|---|
| 3,820,249 | 6/1974 | Stone | 33/347 |
| 4,066,232 | 1/1978 | Hermeyer | 33/372 |
| 4,501,057 | 2/1985 | Palomera | 33/371 |
| 4,663,856 | 5/1987 | Hall et al. | 33/373 |
| 4,829,676 | 5/1989 | Waldron | 33/372 |
| 4,976,040 | 12/1990 | Mish et al. | 33/372 |
| 5,148,605 | 9/1992 | Julia | 33/370 |
| 5,408,752 | 4/1995 | Eadens | 33/376 |
| 5,581,900 | 12/1996 | Payne | 33/370 |

*Primary Examiner*—Christopher W. Fulton
*Attorney, Agent, or Firm*—Woodard, Emhardt, Naughton, Moriarty & McNett

[57] ABSTRACT

A pair of clamps for mounting a level to a joist. Each clamp includes a pair of spaced apart spring biased arms having first ends for gripping the joist. A mounting hole at the lower end of each clamp receives the opposite end of a level which is releasably secured therein. The method of measuring the level of a member includes the steps of mounting the clamps and level to the joist to be measured.

7 Claims, 5 Drawing Sheets

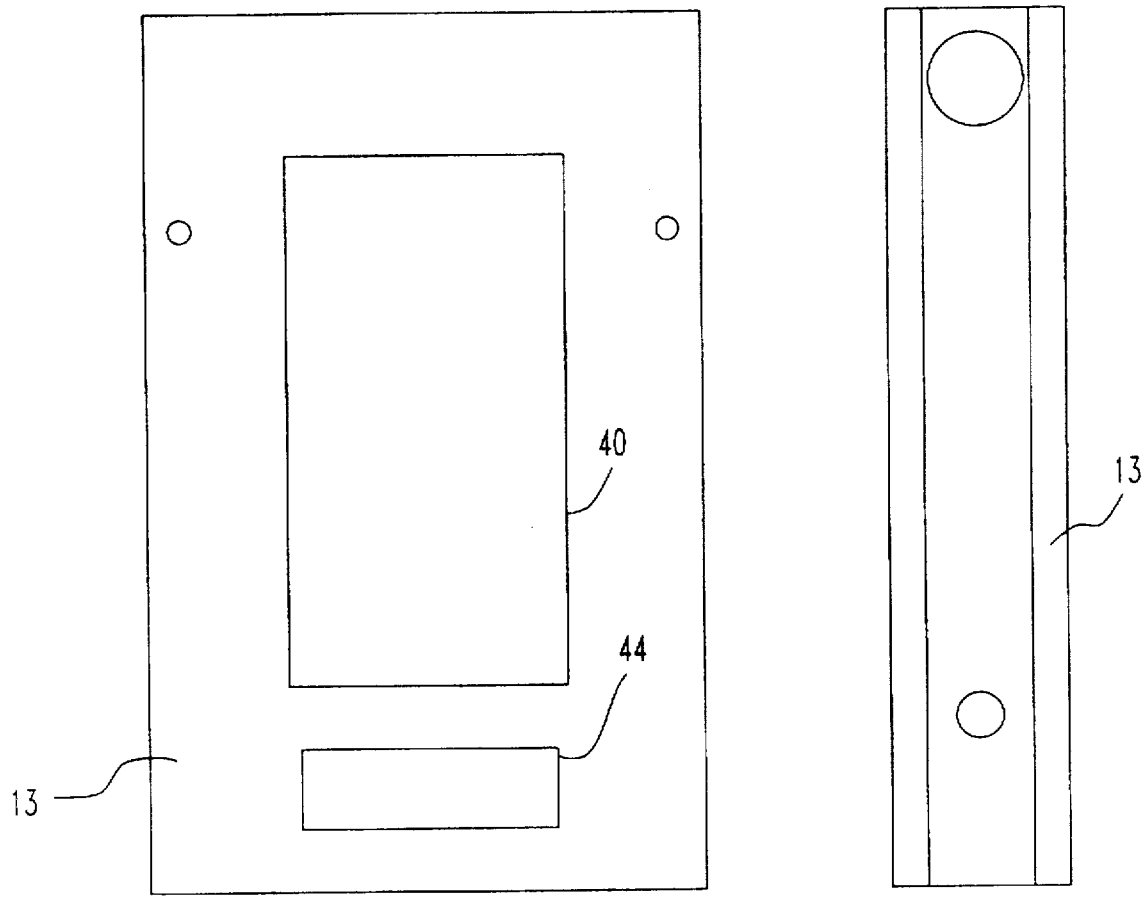

LEVEL MOUNT AND METHOD OF MEASURING THE LEVEL OF A MEMBER

BACKGROUND OF THE INVENTION

1. Field of the Invention

This invention is in the field of tools and methods used for measuring the level of construction members.

2. Description of the Prior Art

In the Prior art, it has been shown that it is possible to temporarily attach a leveling device to a wall, thereby freeing the user's hands. Such an attempted solution is taught by, for example, in Palomera (U.S. Pat. No. 4,501,057) in which a device is secured to the end of a common carpenter's level and is placed on the header of a wall partition. Unfortunately this means it can only be used for a wall partition with no obstacles on top of the wall, for example, a ceiling. In many situations a wall may be built and erected in an existing home or building where there is already a ceiling or other obstacles. This device also has to be removed before the level can be used as a normal level.

Another attempted solution to the problem is taught by Eadens (U.S. Pat. No. 5,408,752) in which a device is attached to a common level on both ends, but has to be held by the user to use.

U.S. Pat. No. 4,066,232 to Hermeyer teaches a device to hold a common level for safe storing when not in use. U.S. Pat. No. 4,829,676 to Waldron teaches a hands-free level indicating device consisted of a specially designed level and securing clips so it can be mounted to a structural member. U.S. Pat. No. 3,820,249 to Stone teaches a self-gripping level device consisting of a specially designed level with magnetic material so it can be affixed to an upright pipe. The last two devices consist of a specially designed level, therefore cannot be used with a common level.

Another approach to mounting a leveling device is disclosed in U.S. Pat. No. 4,663,856 to Hall et al. wherein hook and loop type fabric fasteners are utilized. Elastic bands including flexible magnetic members are disclosed in U.S. Pat. No. 4,976,040 to Mish et al. for mounting a level tool to a post. A level is disclosed in U.S. Pat. No. 5,148,605 to Julia wherein the level is fixedly mounted to a pair of parallel downwardly extending members for placement adjacent a pair of walls being constructed.

Despite the prior devices, there is still a need for a clamp and method for use in leveling a floor joist, ceiling joist, plumbing wall partition and the like which will free up the hands of the construction worker. The clamp and method disclosed herein attaches to an existing common level. Two identical clamps having equal slides are mounted to each end of a level position therebetween. The clamps are securely held to the level by tightening a finger nut assembly on each clamp. The clamps allow the user to attach the level to a floor joist, ceiling joist, wall stud and the like hands free.

The clamps may be provided in a kit including a pair of clamps, in turn, quickly and easily installed on or removed from a stud or joist by squeezable fingers. When the clamps are attached to a stud or joist, they are held in place by finger pads which pivot to accommodate the unevenness of the stud or joist. The kit can be used for all types of joists (floor, ceiling, wall and the like) and can be used thru-out the entire construction of new and existing homes and buildings. The level can also be used in a normal fashion without removing the clamps due to the parallel sides by turning the level over and using the back side of the clamps against the structure to check for plumb and or level. This also allows the level to be used on uneven structures to give a more accurate readings of the overall level or plumbness.

SUMMARY OF THE INVENTION

One embodiment of the present invention is a device for holding a level tool on a member for measuring same comprising a frame, a pair of spring biased clamps movably mounted to the frame and operable to removably clamp onto a member and a level clamp on the frame and operable to removably hold a level in a desired position on the frame.

Another embodiment of the present invention is a method of measuring the levelness of a member comprising the steps of: squeezing a first clamp and a second clamp, positioning a first surface of the first clamp when squeezed adjacent a member at a first location and a second surface of the second clamp when squeezed on the member at a second location spaced apart from the first location, releasing the first clamp to allow the first clamp to fasten onto the member at the first location and the second clamp to allow the second clamp to fasten onto the member at the second location, mounting one end of a level on a third surface of the first clamp parallel to the first surface and an opposite end of the one end of the level on a fourth surface of the second clamp parallel to the second surface; and noting the measurement of levelness provided by the level.

BRIEF DESCRIPTION OF THE DRAWINGS

FIG. 5 is a plan view of frame 13.

FIG. 6 is a side view of the frame.

FIG. 7 is a top view of the frame.

DESCRIPTION OF THE PREFERRED EMBODIMENT

Figure 1:
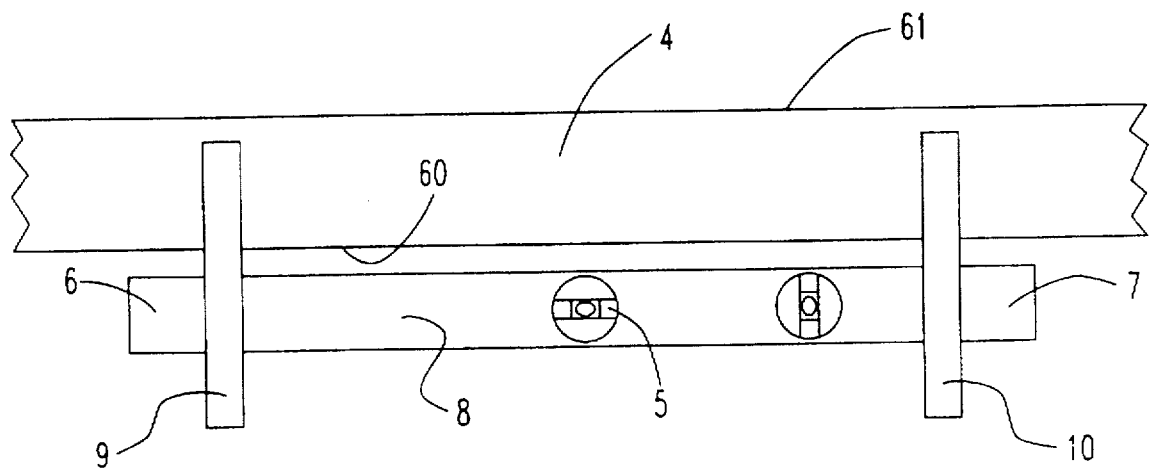
FIG. 1 is a side view of a pair of clamps incorporating the present invention having a level mounted thereto with the clamps, in turn, mounted to a construction member.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to FIG. 1, there is shown the preferred embodiment of the level clamp kit of the present invention having a pair of level clamps 9 and 10 for attachment to a common level 8. A finger nut assembly on each clamp provides a means to secure each clamp to level 8. The spring loaded fingers and pads of each clamp provides a means to attach level 8 to stud or joist 4. The opposite ends 6 and 7 of level 8 are mounted to clamps 9 and 10 and, in turn, mounted to the stud or joist 4. A conventional bubble level gauge 5 is provided on level 8 allowing the worker to measure the levelness of joist 4.

In FIG. 1, the preferred embodiment of the level clamp kit of the present invention is shown having two clamps. Clamp 10 will now be described it being understood that an identical description applies to clamp 9. Both clamps will be used in the same manner. The level clamps can be formed of any suitable rigid material, for example, die-cast aluminum, machine steel or a molded thermalplastic or the like may be employed.

Clamp 10 (FIG. 2) includes a frame 13 having pivotally mounted thereto a pair of arms 11 and 12. A pair of fingers 14 and 15 are pivotally mounted to the top ends respectively of arms 11 and 12. Fingers 14 and 15 provide a gripping means pivotally mounted to the spring biased arms 11 and 12 with the mutually facing surfaces 16 and 17 of fingers 14 and 15 operable to engage and hold the joist or member 4 therebetween. Arms 11 and 12 provide a spring biased clamping means movably mounted to frame 13 operable to removably clamp surfaces 16 and 17 onto member 4.

Figure 3:
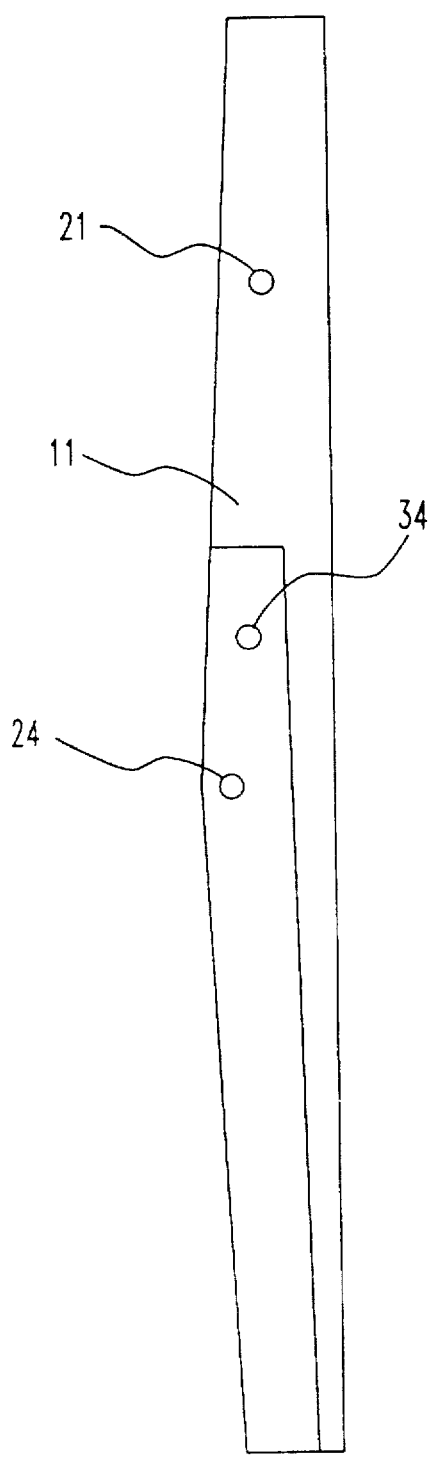
FIG. 3 is a plan view of arm 11 mounted to the clamp of FIG. 2.
Figure 4:
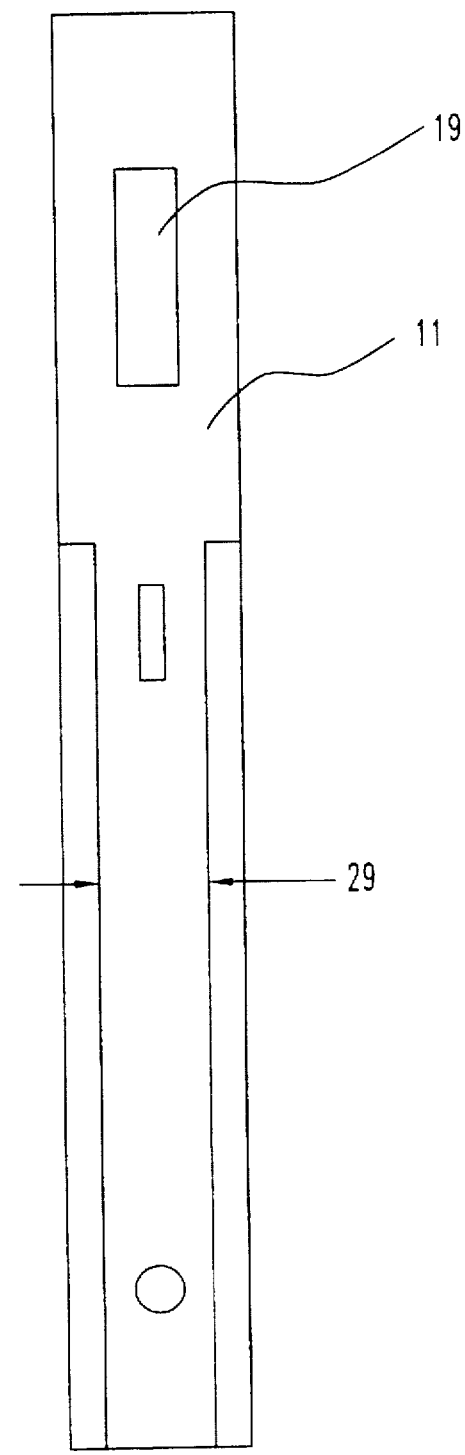
FIG. 4 is a left side view of the arm of FIG. 3.
Figure 10:
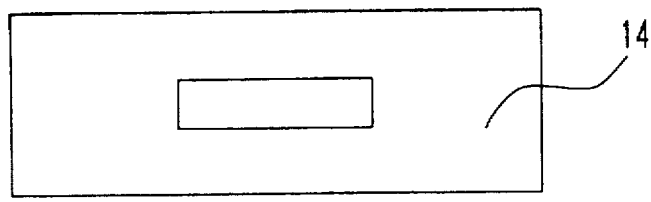
FIG. 10 is a top view of the finger.
Figure 8:
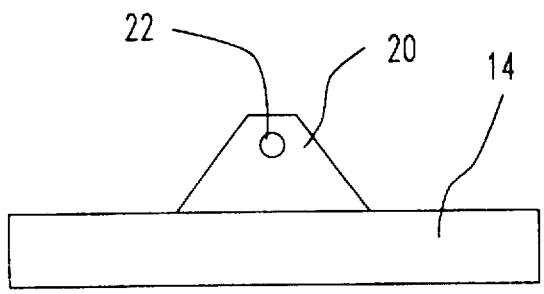
FIG. 8 is a plan view of finger 14.
Figure 9:
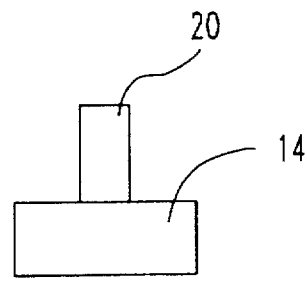
FIG. 9 is a side view of the finger.

Arms 11 and 12 are identical and thus the following description of arm 11 will apply equally to arm 12. Arm 11 (FIGS. 3 and 4) includes a top end 18 having a recess 19 formed therein to receive projection 20 (FIG. 8) of finger 14. A standard roll pin extends through hole 21 (FIG. 3) of arm 11 and then through hole 22 of projection 20 (FIG. 8) pivotally mounting finger 14 to the top distal end of the arm. Arm 11 is pivotally mounted to frame 13 by a standard roll pin 23 (FIG. 2) which extends through frame 13 and hole 24 (FIG. 3) of arm 11.

Frame 13 has a dado cut in the opposite sides forming a pair of slots 25 and 26 (FIG. 7) to accept the pivotable arms 11 and 12. Each arm has a reduced width allowing the arm to fit within each slot. For example, arm 11 has a reduced width 29 (FIG. 4) allowing the arm to project into slot 26 between guide or alignment surfaces 27 and 28 (FIG. 7).

Figure 2:
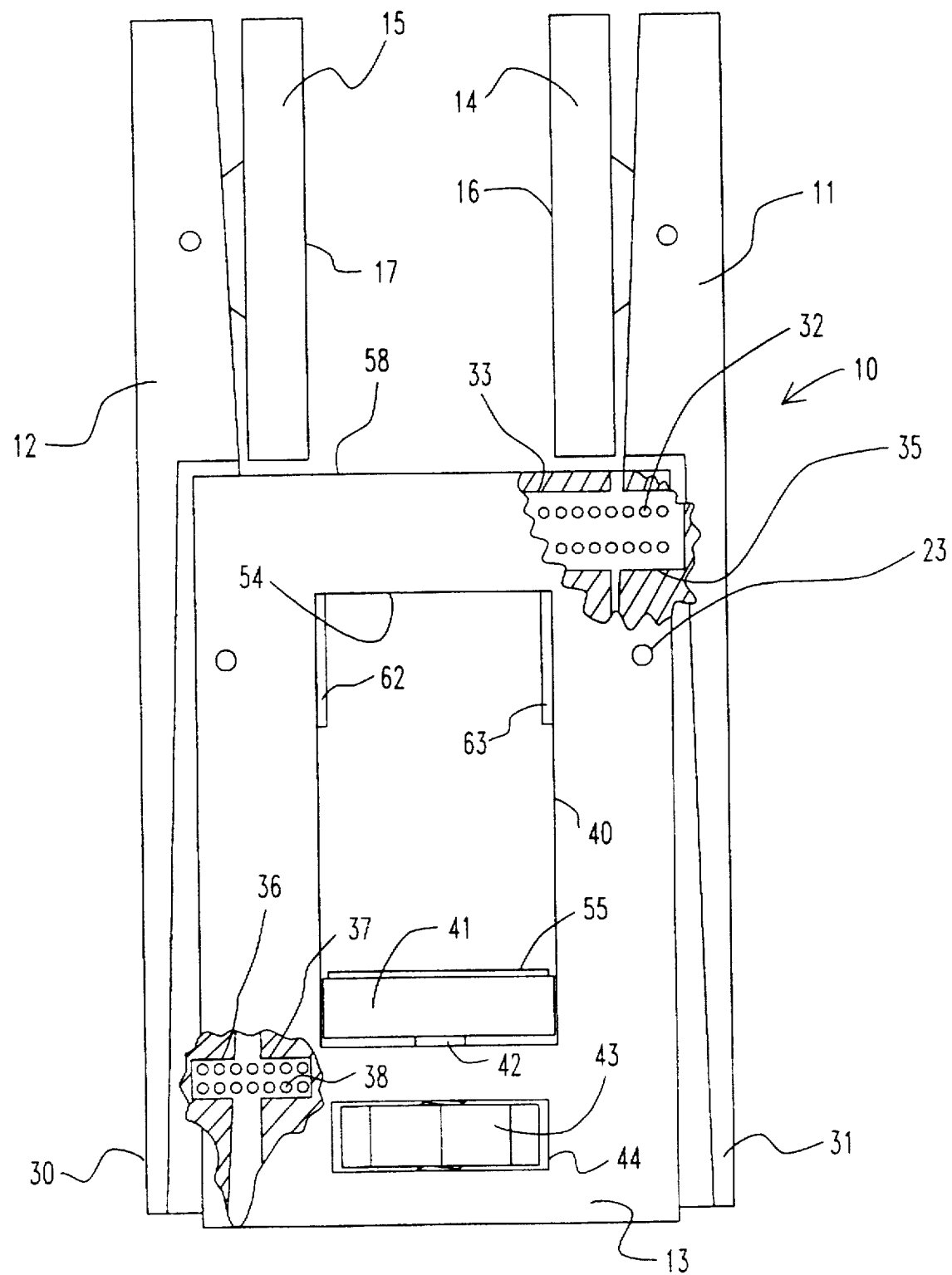
FIG. 2 is a fragmentary plan view of clamp 10.

In the embodiment shown in FIG. 2, three springs are operable to urge surfaces 16 and 17 toward each other but are yieldable to allow the bottom ends 30 and 31 of the arms to be squeezed thereby moving surfaces 16 and 17 apart from the joist. The first spring 32 extends freely through hole 33 formed in the top end of frame 13. The opposite ends of spring 32 are fixedly attached within mutually facing sockets formed within arms 11 and 12. Conventional fastening devices 34 (FIG. 3) fixedly attach each end of spring 32 to each arm. For example, arm 11 includes a socket 35 (FIG. 2) into which one end of spring 32 projects with fastening device 34 fixedly securing one end of the spring to arm 11. In a like manner, the opposite end of spring 32 is attached to arm 12. Since spring 32 is located above the pivot pin extending through hole 24, the spring is tensioned to urge the top ends of the arms together but is yieldable to allow the bottom ends of the arms to be squeezed moving surfaces 16 and 17 apart from the joist. A pair of compression springs are mounted between the bottom ends of each arm and frame 13 in mutually facing sockets. For example, bottom end 30 of arm 12 includes socket 36 positioned immediately across from socket 37 formed in frame 13. A helical compression spring 38 is positioned within sockets 36 and 37 and is operable to normally urge bottom end 30 outwardly from frame 13 but yieldable to allow bottom end 30 to be squeezed toward frame 13. A similar compression spring is located between bottom end 31 of arm 11 and frame 13 with the pivot point of each arm being located between the tension spring 32 and the pair of compression springs located at the bottom of the clamp.

Figure 11:
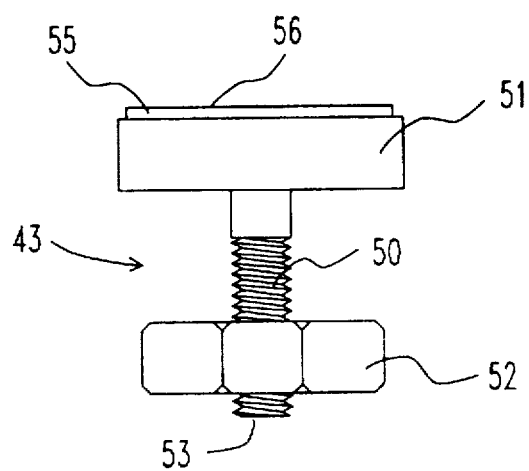
FIG. 11 is a plan view of the finger nut assembly.

Each clamp has a finger nut assembly 43 (FIG. 11) to hold the opposite end of each level. Assembly 43 includes an externally threaded rod 50 having a top end fixedly secured to mounting block 51. Frame 13 includes a hole extending from rectangular opening 40 (FIG. 2) to rectangular opening 44 through which threaded member 50 extends. A thumb nut 52 is threaded onto threaded rod 50 with nut 52 being held captive within opening 44 and block 51 being held captive within opening 40. The bottom end 53 of threaded rod 50 extends into a hole leading from opening 44 through the bottom end of frame 13. Thus, as thumb nut 52 is rotated within opening 44, block 51 is caused to move to or from the top surface 54 (FIG. 2) of opening 40 depending upon the direction of the rotation of the thumb nut. As a result, one end of the level may be inserted into opening 40 with thumb nut 52 then being rotated to force the level against surface 54 thereby securely mounting the level 8 to the clamp. A compression pad 55 is fixedly mounted atop block 51 and provides an upwardly facing surface 56 (FIG. 11) parallel to surface 54 and to the upwardly facing surface 58 (FIG. 2) of the clamp frame. As a result, if the level 8 is to be mounted beneath joist 4, then the bottom surface 60 of joist 4 (FIG. 1) may be positioned adjacent and in contact with surface 58 thereby automatically being aligned with the upwardly facing surface 56 which, in turn, is parallel to bubble gauge 5 of level 8. As a result, the bubble gauge 5 is automatically aligned to be parallel with the bottom surface of joist 60 with the result that if the joist is uneven or does not extend horizontally, then the bubble gauge will indicate same. The clamps may be positioned in a variety of alternative positions with the same result. That is, it may be necessary to mount the clamps above and to joist 4 so that the upwardly facing surface 61 of the joist is in contact with surface 58 thereby automatically aligning surface 61 with the bubble gauge 5 causing the bubble gauge to indicate whether or not the joist is level or extends horizontally. In similar fashion, the clamps and level may be used to indicate the verticalness of a joist with the bubble gauge being appropriately located on the level.

A pair of cushions 62 and 63 (FIG. 2) are provided on the mutually facing sides of opening 40 to cushingly receive level 8. Likewise, a pair of abrasive surfaces may be formed or attached to surfaces 16 and 17 to grippingly receive joist 4 therebetween.

Arms 11 and 12 of the clamp provide a spring biased clamping means which is movably mounted to frame 13 and operable to removably clamp to a joist or member. Opening 40 along with thumb assembly 43 provides a level clamping means on the frame operable to removably hold the level in a desired position on the frame. The size of opening 40 may be adjusted depending upon the size of the level inserted therein by means of rotating thumb nut 52 thereby moving surface 56 relative to surface 54. Automatic alignment means are provided on frame 13 and arms 11 and 12 to automatically align the arms relative to the portion of the frame holding the level. The alignment means includes a number of cooperating surfaces. First, the width 29 (FIG. 4) of each arm extends into the slots 25 and 26 to prevent the arms from cocking relative to the frame. For example, surfaces 27 and 28 are positioned on the opposite sides of width 29 thereby insuring the arm extends along the longitudinal axis of the frame. Next, surfaces 54, 56 and 58 are always parallel thereby insuring that the bubble gauge positioned on the level held by the clamp is aligned relative to the portion of the joist resting on surface 58.

The tool for removably holding level 8 relative to member 4 (FIG. 1) to measure the horizontalness of the member includes the pair of clamps 9 and 10 which are grippingly mounted to member 4, while at the same time removably holding the opposite ends of level 8. The method of measuring the horizontalness of member 4 includes the steps of squeezing clamps 9 and 10 while positioning the member between the opposing fingers of each clamp such that member 4 contacts surface 58 of each clamp. Each clamp is released to allow each clamp to fasten onto the member at spaced apart locations. The method also includes a step of mounting ends 6 and 7 of level 8 on surface 56 of each clamp with surfaces 56 being parallel to surfaces 54 and 58. The measurement of horizontalness provided by the level is then noted. The method also includes the substeps of moving surface 56 relative to surface 54 depending upon the size of the level inserted within opening 40. The level may be mounted either above or below member 4 or to either side if member 4 extends vertically. Likewise, clamps 9 and 10 are mounted to two spaced apart locations on member 4 so the spacing therebetween does not exceed the length of level 8.

Many variations are contemplated and included in the present invention. Pads 55, 62 and 63 may be produced of any suitable material, such as, foam rubber, stainless steel, aluminum, or the like. Likewise, the gripping surfaces 16 and 17 can be produced from any suitable material, for instance, foam rubber pads, stainless steel or aluminum sheet, or the like. Clamps 9 and 10 can be mounted one at time to joist 4 or the clamps can be mounted simultaneously to the joist. Further the level 8 can first be mounted to clamps 9 and 10 and the clamps then mounted to the joist or the clamps can first be mounted to the joist with the level then mounted to the clamps.

The invention may also be modified in such a manner that other types of levels may be employed, such as a smart level. In the case of a smart level, opening 40 may be reconfigured as a triangular hole in lieu of a rectangular hole so long as surfaces 56 and 58 are parallel. Likewise, the clamp may be modified in such a manner that a common level may be used with other size lumber or the like, such as a 4×4, 4×6, 6×6, etc. In the event the width of the joist or member to be positioned between surfaces 16 and 17 is wider than the normal spacing between surfaces 16 and 17 then it will be necessary to employ arms 11 and 12 having wider spaced apart top ends. Likewise, while although the preferred embodiment has been described as having three springs to urge the top ends of the arms against the joist, it is to be understood that a lesser number or greater number of springs may be so employed.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A device for holding a level tool on a member for measuring same comprising:

a frame having a level hole;

spring biased clamping means movably mounted to said frame and operable to removably clamp onto a member;

level clamping means on said frame and operable to removably hold a level in a desired position on said frame, said level clamping means having adjustable means movably mounted to said frame and positioned within said level hole operable to allow sizing of said level hole depending upon the level extending therein; and gripping means pivotally mounted to said spring biased clamping means and having mutually facing gripping surfaces to engagingly hold the member therebetween.

2. The device of claim 1 wherein:

said level clamping means includes mutually facing gripping surfaces to engagingly hold a level within said level hole.

3. The device of claim 2 and further comprising:

alignment means on said frame and said spring biased clamping means to align said spring biased clamping means relative to said level clamping means when said spring biased clamping means is clamped onto the member.

4. The device of claim 3 wherein:

said spring biased clamping means include a pair of opposed arms, said arms have first ends and opposite second ends with said arms pivotally mounted to said frame between said first ends and said second ends, said first ends have said gripping means pivotally mounted thereto with second ends forming a pair of squeezable handles to allow squeezing thereof opening said gripping means for insertion of the member therebetween.

5. A tool for removably holding a level on a member to measure the levelness of said member comprising:

a first device including a first frame, a first pair of spaced apart arms pivotally mounted thereto with mutually facing first gripping surfaces removably positionable grippingly onto a member, first spring means engaged with said first pair of arms and operable to urge said first gripping surfaces together, and, a first level holder associated with said first frame and said first pair of arms to removably hold a level; and, a second device including a second frame, a second pair of spaced apart arms pivotally mounted thereto with mutually facing second gripping surfaces removably positionable grippingly onto said member with said member extending between said first device and said second device, second spring means engaged with said second pair of arms and operable to urge said second gripping surfaces together, and, a second level holder associated with said second frame and said second pair of arms to removably hold said level with said level extending between said first device and said second device; and wherein:

said first level holder and said second level holder each include a hole on respectively said first frame and said second frame into which said level may extend and each further include a movable surface adjacent said hole of each said first frame and said second frame to size same depending on the size of level extended therein, said first frame and said second frame each include a supporting surface parallel to said movable surface allowing said level resting on said movable surface to measure said member gripped by said first gripping surfaces and said second gripping surfaces and resting on said supporting surface; and said first level holder and said second level holder each include a pair of mutually facing compressible and parallel pads mounted within said hole of each said first frame and said second frame to releasably hold said level therebetween.

6. A tool for removably holding a level on a member to measure the levelness of said member comprising:

a first device including a first frame, a first pair of spaced apart arms pivotally mounted thereto with mutually facing first gripping surfaces removably positional grippingly onto a member, first spring means engaged with said first pair of arms and operable to urge said first gripping surfaces together, and, a first level holder associated with said first frame and said first pair of arms to removably hold a level; and, a second device including a second frame, a second pair of spaced apart arms pivotally mounted thereto with mutually facing second gripping surfaces removably positionable grippingly onto said member with said member extending between said first device and said second device, second spring means engaged with said second pair of arms and operable to urge said second gripping surfaces together, and, a second level holder associated with said second frame and said second pair of arms to removably hold said level with said level extending between said first device and said second device; and wherein:

said first level holder and said second level holder each include a hole on respectively said first frame and said second frame into which said level may extend and each further include a movable surface adjacent said hole of each said first frame and said second frame to size same depending on the size of level extended therein, said first frame and said second frame each include a supporting surface parallel to said movable surface allowing said level resting on said movable surface to measure said member griped by said first gripping surfaces and said second gripping surfaces and resting on said supporting surface; and said first spring means and said second spring means include a first spring and a second spring extending respectively through said first frame and said second frame and engaged with said first pair of arms and said second pair of arms normally pulling said first pair of arms together and said second pair of arms together and a first pair of springs and a second pair of springs engaged respectively with said first frame and said second frame and said first pair of arms and said second pair of arms normally pushing said first pair of arms together and said second pair of arms together.

7. A tool for removably holding a level on a member to measure the levelness of said member comprising:

a first device including a first frame, a first pair of spaced apart arms pivotally mounted thereto with mutually facing first gripping surfaces removably positionable grippingly onto a member, first spring means engaged with said first pair of arms and operable to urge said first gripping surfaces together, and, a first level holder associated with said first frame and said first pair of arms to removably hold a level;

a second device including a second frame, a second pair of spaced apart arms pivotally mounted thereto with mutually facing second gripping surfaces removably positionable grippingly onto said member with said member extending between said first device and said second device, second spring means engaged with said second pair of arms and operable to urge said second gripping surfaces together, and, a second level holder associated with said second frame and said second pair of arms to removably hold said level with said level extending between said first device and said second device; and, alignment means pivotally mounting said first gripping surfaces to said first pair of arms and pivotally mounting said second gripping surfaces to said second pair of arms.

* * * * *